(12) United States Patent
Jacobson et al.

(10) Patent No.: US 8,219,777 B2
(45) Date of Patent: Jul. 10, 2012

(54) VIRTUAL STORAGE SYSTEMS, VIRTUAL STORAGE METHODS AND METHODS OF OVER COMMITTING A VIRTUAL RAID STORAGE SYSTEM

(75) Inventors: Michael Jacobson, Boise, ID (US); Lee L. Nelson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2687 days.

(21) Appl. No.: 10/264,659

(22) Filed: Oct. 3, 2002

(65) Prior Publication Data

US 2004/0068636 A1    Apr. 8, 2004

(51) Int. Cl.
  *G06F 12/00* (2006.01)
(52) U.S. Cl. .................... 711/203; 711/161; 711/162
(58) Field of Classification Search .................. 711/203, 711/161, 162
  See application file for complete search history.

(56) References Cited

U.S. PATENT DOCUMENTS

| | | | |
|---|---|---|---|
| 5,392,244 A | | 2/1995 | Jacobson |
| 6,112,286 A | * | 8/2000 | Schimmel et al. ............ 711/208 |
| 6,192,444 B1 | * | 2/2001 | White et al. ...................... 711/4 |
| 6,205,450 B1 | | 3/2001 | Kanome |
| 6,311,193 B1 | | 10/2001 | Sekido |
| 7,020,668 B2 | | 3/2006 | Matsuda et al. |
| 2002/0188461 A1 | * | 12/2002 | Matsumoto ........................ 705/1 |
| 2004/0030951 A1 | * | 2/2004 | Armangau ........................ 714/6 |

FOREIGN PATENT DOCUMENTS

| | | |
|---|---|---|
| JP | 11-120055 | 4/1999 |
| JP | 11-134117 | 5/1999 |
| JP | 2002-123410 | 4/2002 |

OTHER PUBLICATIONS

Microsoft Computer Dictionary, 1999, Microsoft Press, Fourth Edition, p. 372.*
HP Executive Summary "Virtualization, Simplification, and Storage"; www.hp.com; Nov. 2001; pp. 1-9.
"Cassini FAQs, Snapshot"; Revision 1; Hewlett-Packard Company; May 2000; pp. 1-6.
"Business Copy Virtual Array Integration Guide", "Data Replication and Backup for the HP VA 7000 Series"; Revision Level 1.1; Hewlett-Packard Company; Jul. 2001; pp. ii-iv and 1-14.
U.S. Patent Appn. filed Oct. 3, 2002, titled "Virtual Storage Systems and Virtual Storage System Operational Methods", by Lee L. Nelson and Rodger Daniels.
U.S. Patent Appn. filed Oct. 3, 2002, titled "Virtual Storage Systems and Virtual Storage System Operational Methods", by Rodger Daniels and Lee L. Nelson.

(Continued)

*Primary Examiner* — Midys Rojas

(57) ABSTRACT

Virtual storage systems, virtual storage methods and methods of over committing a virtual RAID storage system are described. According to one aspect, a virtual storage system includes a virtual storage space, a physical storage space, a mapping system configured to associate a plurality of addresses of the virtual storage space with respective addresses of the physical storage space and a controller configured to automatically remove a portion of the mapping system according to a prioritization protocol which specifies removal of portions of the mapping system according to an order.

50 Claims, 5 Drawing Sheets

OTHER PUBLICATIONS

U.S. Patent Appn. filed Oct. 3, 2002, titled "Computer Systems, Virtual Storage Systems and Virtual Storage System Operation Methods", by Michael Brent Jacobson and Lee L. Nelson.

U.S. Patent Appn. filed Oct. 3, 2002, titled "Method of Managing a Data Storage Array, and a Computer System Including a RAID Controller", by David Umberger and Guillermo Navarro.

U.S. Patent Appn. filed Oct. 3, 2002, titled "Managing a Data Storage Array, A Data Storage System, and a RAID Controller", by David Umberger, Guillermo Navarro, and Rodger Daniels.

HP Virtual Array Technology; "Virtual Storage Technology Extends the Capabilities of Fault-Tolerant Storage Subsystems"; www.hp.com; Nov. 2001; pp. 1-9.

* cited by examiner

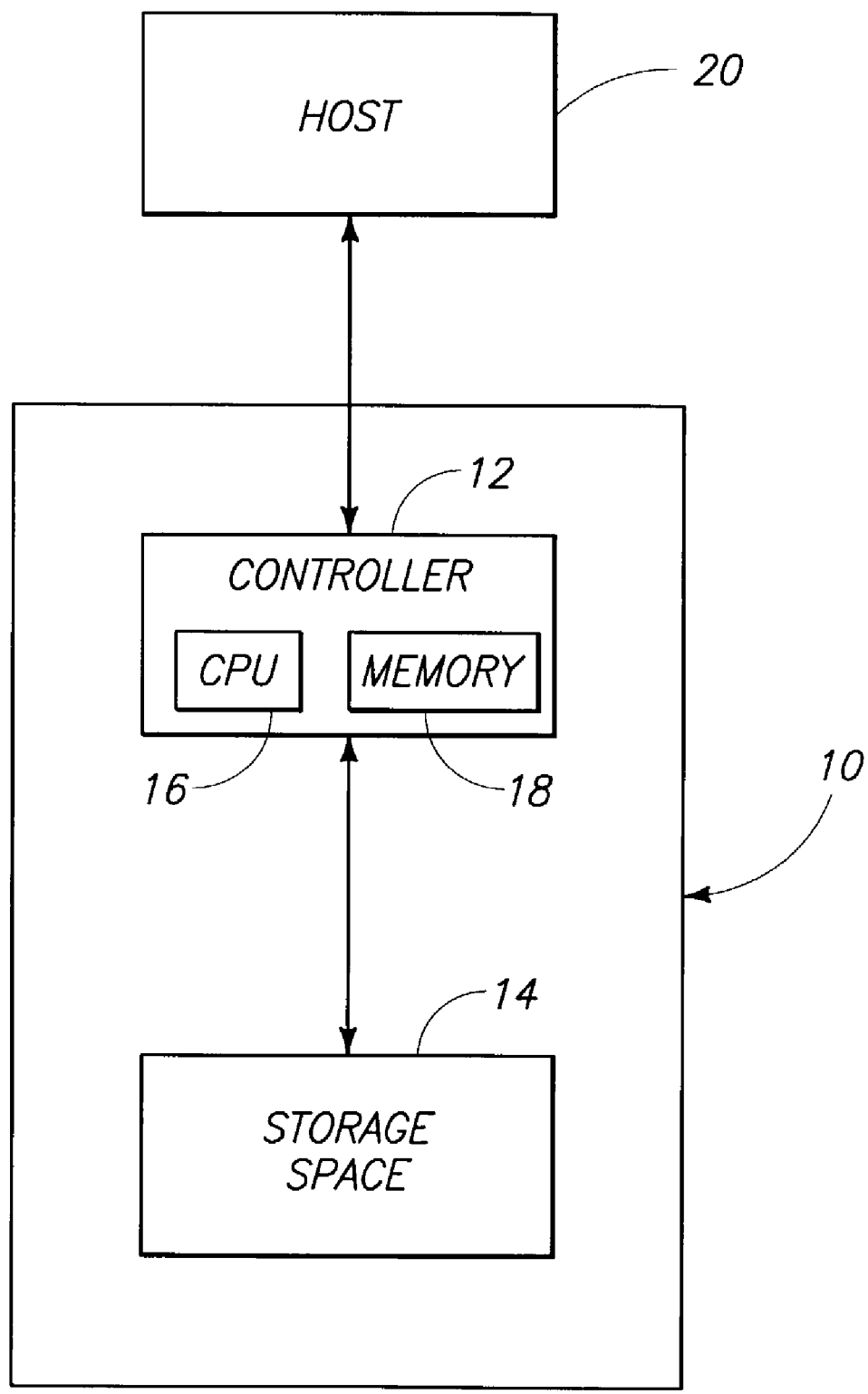

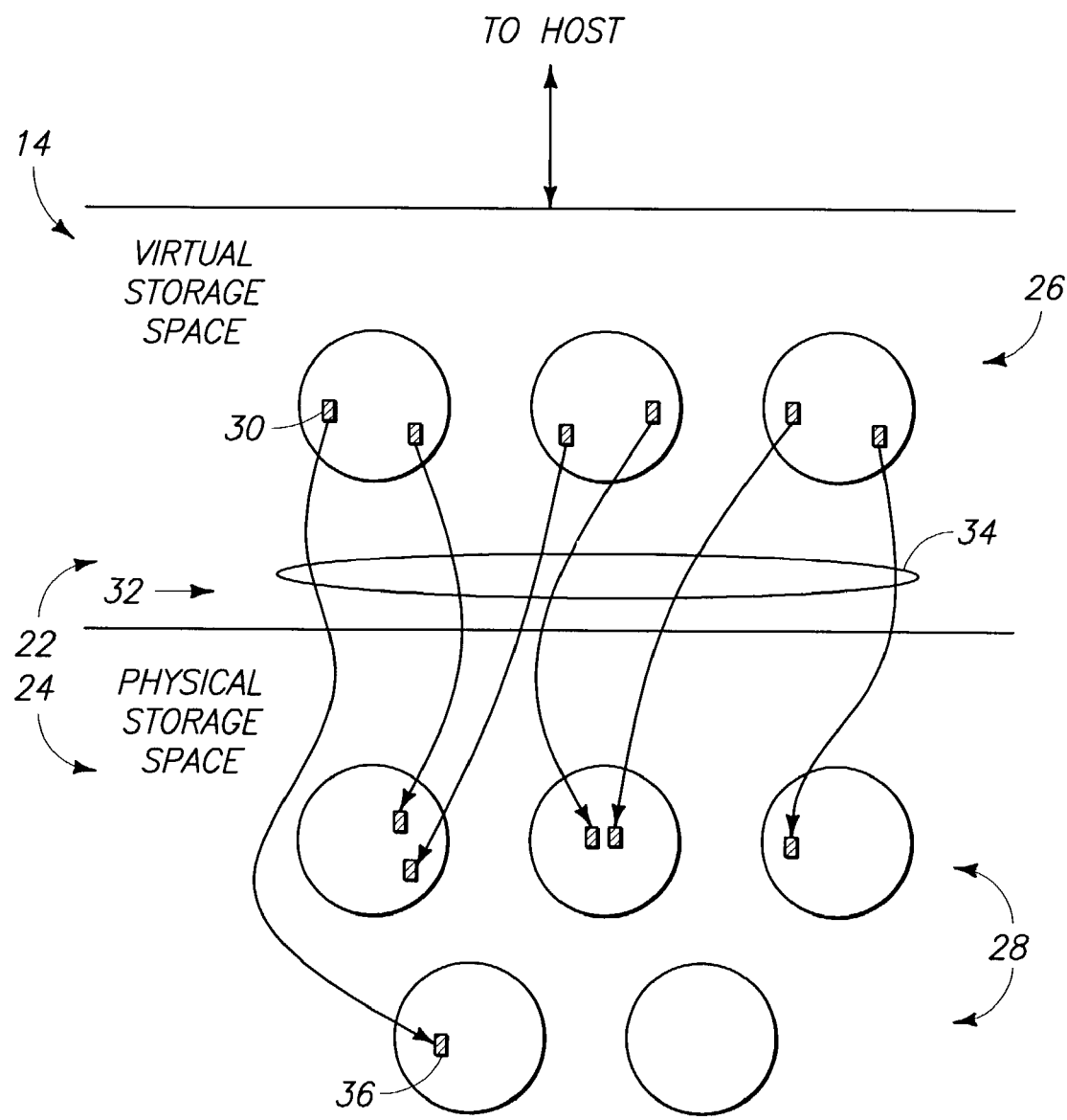

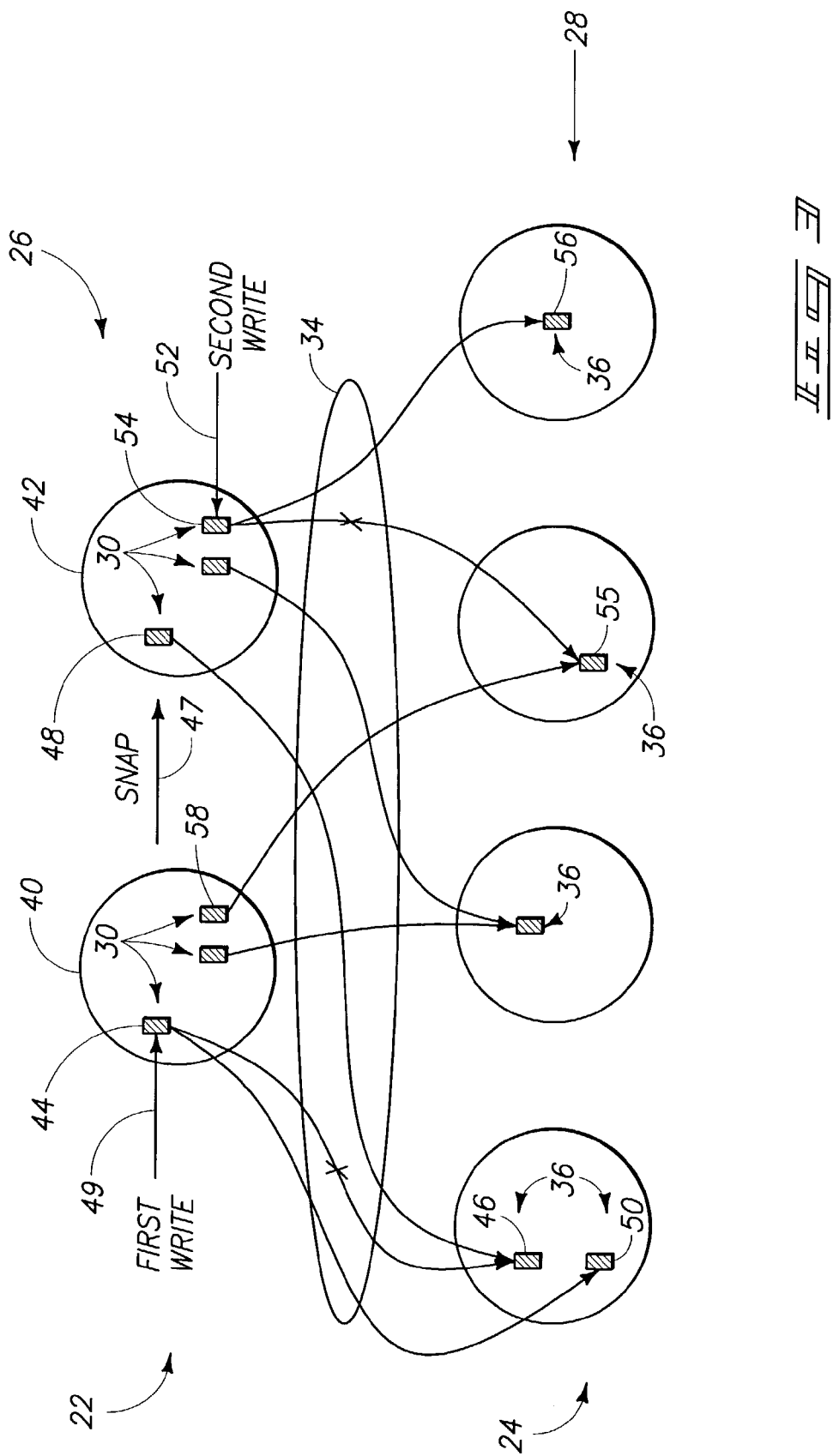

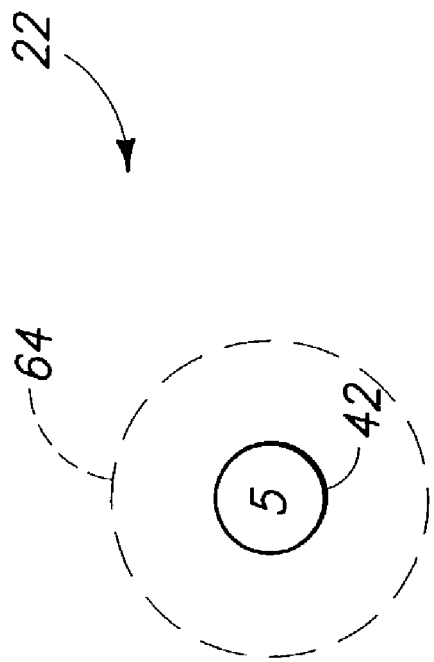
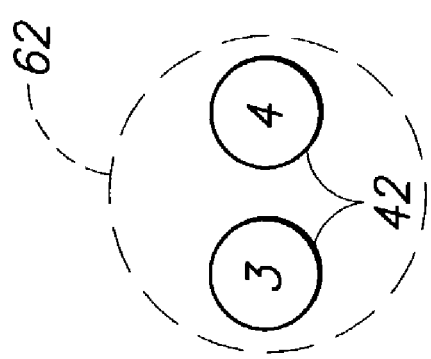
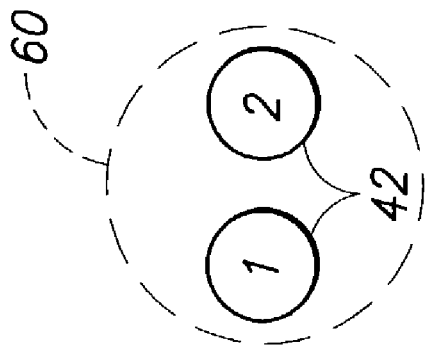

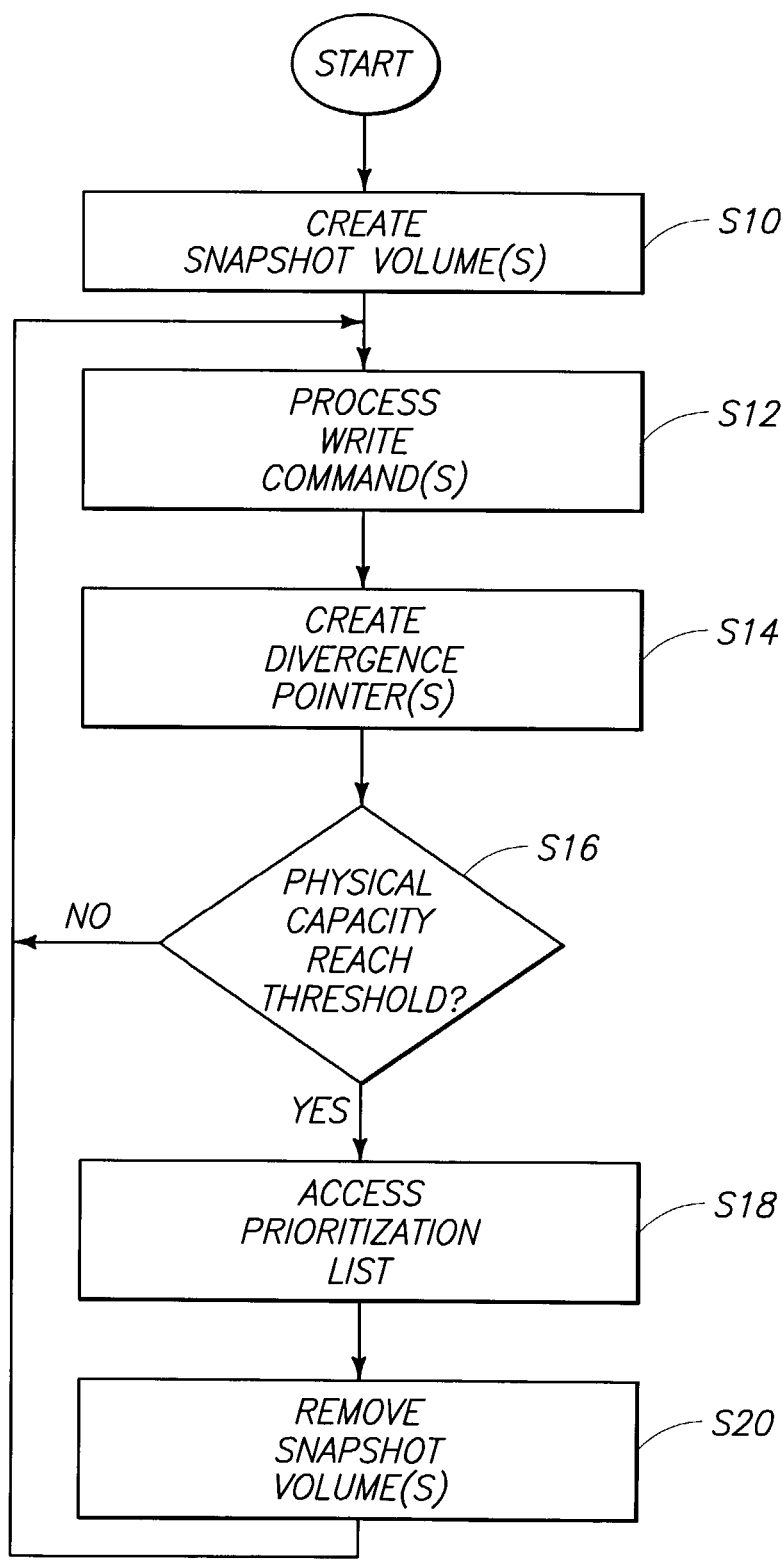

VIRTUAL STORAGE SYSTEMS, VIRTUAL STORAGE METHODS AND METHODS OF OVER COMMITTING A VIRTUAL RAID STORAGE SYSTEM

FIELD OF THE INVENTION

The invention relates to virtual storage systems, virtual storage methods and methods of over committing a virtual RAID storage system.

BACKGROUND OF THE INVENTION

Computer systems including hardware, software, firmware etc. have continued to experience expansive growth and sophistication in recent years. Peripherals and other components arranged to interface with computer systems have also experienced expansive growth and improvements.

In addition, computer systems are generally used in an increasing number of applications especially with the advancements made in networking solutions enabling communication between remotely spaced computers. For example, computer systems may be utilized in client applications, server applications as well as stand-alone personal computing applications.

With the increased processing speeds of computer systems, and the increasing usage of computer systems in new and varied applications, devices are desired to assist with storing and quickly accessing data processed and used by computer systems. Mass storage devices have been developed to handle large amounts of digital data utilized by computer systems. Redundant storage systems have been developed to provide continued, correct operations during the presence of a fault or other failure in a component or peripheral of a computer system. More specifically, three primary design criteria are typically considered when developing mass storage devices and include cost (low cost per unit of data storage), high input/output performance, and availability (ability to recover data even though some components have failed and to insure continued operation). Redundant array of independent disk (RAID) systems have been utilized to provide redundant storage of relatively large amounts of data.

As described below, aspects of the present invention provide improved systems and methodologies for storing and providing data for use in associated computer applications.

DESCRIPTION OF THE DRAWINGS

FIG. 1 is a functional block diagram of an exemplary storage system.

FIG. 2 is an illustrative representation of the storage system of FIG. 1 implemented as an exemplary virtual storage system.

FIG. 3 is an illustrative representation of a snapshot operation of the exemplary virtual storage system.

FIG. 4 is an illustrative representation of an exemplary prioritization protocol of virtual storage space of the virtual storage system.

FIG. 5 is a flow chart depicting an exemplary methodology of data management of the virtual storage system.

DETAILED DESCRIPTION OF THE INVENTION

Attention is directed to the following commonly assigned applications, which were filed the same day as the present application and are incorporated herein by reference:

U.S. patent application Ser. No. 10/264,915 entitled "A System for Managing a Data Storage Array, a Method of Managing a Data Storage System, and a RAID Controller," by inventors David Umberger, Guillermo Navarro and Rodger Daniels; U.S. patent application Ser. No. 10/264,573 entitled "Method of Managing a Data Storage Array, and a Computer System Including a RAID Controller," by inventors David Umberger and Guillermo Navarro; U.S. patent application Ser. No. 10/264,957 entitled "Computer Systems, Virtual Storage Systems and Virtual Storage System Operational Methods," by inventors Michael B. Jacobson and Lee L. Nelson; U.S. patent application 10/264,525 entitled "Virtual Storage Systems and Virtual Storage System Operational Methods," by inventors Rodger Daniels and Lee L. Nelson; and U.S. patent application Ser. No. 10/264,661 entitled "Virtual Storage Systems and Virtual Storage System Operational Methods," by inventors Lee L. Nelson and Rodger Daniels.

According to one aspect of the invention, a virtual storage system comprises a virtual storage space, a physical storage space, a mapping system configured to associate a plurality of addresses of the virtual storage space with respective addresses of the physical storage space and a controller configured to automatically remove a portion of the mapping system according to a prioritization protocol which specifies removal of portions of the mapping system according to an order.

According to another aspect of the invention, a virtual storage system comprises physical storage means for storing data, virtual storage means for providing a representation of the physical storage means to a host, mapping means for providing a plurality of pointers from a plurality of addresses of the virtual storage means to a plurality of respective addresses of the physical storage means and control means for detecting a predetermined status of the physical storage means and automatically removing at least some of the pointers responsive to the detecting.

According to an additional aspect of the invention, a virtual storage method comprises providing a virtual storage space comprising a plurality of virtual storage volumes, providing a physical storage space, creating a plurality of snapshot volumes of at least some of the virtual storage volumes, assigning respective priorities to the snapshot volumes and removing at least one of the snapshot volumes according to the priorities.

According to yet another aspect of the invention, a method of over committing a virtual RAID storage system comprises providing a plurality of pointers to associate a plurality of physical storage locations of a physical storage space with a plurality of virtual storage locations of a virtual storage space, over committing the virtual storage system including copying at least some of the pointers providing a plurality of snapshot volumes, assigning a plurality of priorities to respective ones of the snapshot volumes, diverging at least some of the pointers after the copying including associating the diverged pointers with a plurality of new respective physical storage locations, the diverging consuming additional physical storage space to store diverged data associated with respective ones of the diverged pointers, detecting a remaining storage capacity of the physical storage space obtaining a predetermined status after the diverging, selecting at least one of the snapshot volumes using the priorities and responsive to the detecting and removing the at least one of the snapshot volumes after the selecting.

Referring to FIG. 1, an exemplary arrangement of a data storage system is depicted as reference number 10. According to aspects of the invention, storage system 10 is embodied as a virtual storage system. In one arrangement, storage system 10 is a virtual array (RAID) storage system having abstract addressing or mapping between a virtual storage space and physical storage space as described in further detail below. Virtual storage system arrangements differ from conventional disk array constructions which utilize mathematical functions to provide literal addressing which are fixed to blocks of physical storage space wherein a given address corresponds to a known physical block. Virtual storage systems implement adaptive, dynamic and arbitrary addressing enabling increased flexibility compared with conventional arrangements. For example, a plurality of virtual storage addresses of virtual storage space may be utilized to address a single physical storage location of physical storage space. In such a virtual storage system arrangement, point in time copies of data, also referred to as snapshot volumes of data, may be created which may result, in over commitment of a virtual storage system as divergence of data occurs. Virtual storage system arrangements provide increased apparent capacity and flexibility compared with conventional constructions.

Storage system 10 arranged as a virtual storage configuration utilizes linear addressing space according to a Small Computer System Interface (SCSI) command set in one exemplary configuration. Although the presentation of storage system 10 to a host 20 may be consistent at different moments in time, a mapping system of a virtual storage system arrangement may change to accommodate demands or requirements of the storage system. Exemplary details regarding a virtual storage system are discussed in U.S. Pat. No. 5,392,244 to Jacobson et al., the teachings of which are incorporated herein by reference. Further details and aspects of virtual array technology are described in HP Virtual Array Technology, 2001 and Executive Summary: Virtualization, Simplification and Storage, November 2001, both available from www.hp.com, and the teachings of which are incorporated herein by reference.

Still referring to FIG. 1, storage system 10 in the exemplary described arrangement includes a controller 12 and storage space 14 arranged to store data. Storage system 10 in the illustrated application is configured to interface with host 20. Storage system 10 is arranged to store data received from host 20 as well as provide requested data to host 20. Host 20 may be implemented as a workstation, personal computer, server, network of computer devices, or other appropriate computer structure utilizing a separate data storage system.

In the illustrated configuration, controller 12 is arranged to implement interfacing operations with respect to host 20 including handling of input/output (I/O) requests. In addition, controller 12 provides management of storage space 14 including addressing of storage space 14 and implementing storage of data therein. As described below in one exemplary configuration, controller 12 is arranged to create a virtual storage space representation of physical storage space and a mapping system to provide addressing therebetween.

In the depicted exemplary arrangement, controller 12 includes a central processing unit (CPU) 16 and memory 18. An exemplary central processing unit is a PowerPC 440 or 8240 available from Motorola, Inc.

Controller 12 of storage system 10 may be configured to implement AutoRAID operations as discussed in the '244 patent discussed above. Controller 12 implementing AutoRAID operations may monitor use of data stored within system 10 and determine a best RAID level for the data. For example, infrequently written data is stored in RAID 5DP providing storage efficiency while frequently written data may be stored in RAID 1+0 providing optimum performance. Data may be moved between RAID levels depending upon the age of the data, frequency of accessing the data, and other factors.

Memory 18 may be utilized to store maps as described further below for use in addressing storage space 14, to store executable code usable by controller 12, and to provide a cache for temporarily storing data. Memory 18 may include a plurality of separate memory areas for storing executable code, maps, and cache in one embodiment.

Referring to FIG. 2, an illustrative representation of storage space 14 of system 10 is shown. Storage space 14 includes a virtual storage space 22 and a physical storage space 24 according to an exemplary virtual storage architecture of the described system 10. Virtual storage space 22 includes a plurality of virtual storage volumes 26 and physical storage space 24 includes a plurality of physical storage volumes 28. The depicted number of volumes 26; 28 is exemplary and more or less volumes 26 or volumes 28 may be utilized in a given application.

Virtual storage volumes 26 may be referred to as logical unit numbers (LUNs), logical volumes or logical drives. Virtual storage space 22 including virtual storage volumes 26 provide a convenient representation of storage capacity to host 20. Host 20 may utilize a SCSI command set to implement addressing of storage space 14 including virtual storage volumes 26. Host 20 may implement a logical volume manager, such as LVM software for use in an HP-UX operating system and available from Hewlett-Packard Company, to provide centralized management of storage system 10. For example, a logical volume manager may provide a virtualization of data storage of storage system 10 within host 20 for use in interfacing storage system 10 with host applications. Management features of system 10 may appear in a plurality of software management interfaces: SCSI command set, Virtual Front Panel (VFP), Graphical User Interface (GUI), Command Line User Interface (CLUI), Application Programming Interface (API), etc. for use in various solutions integrations.

Physical storage volumes 28 may comprise an array of disks individually configured to provide actual storage digital data (i.e., no data is stored using virtual storage space in the described configuration). In one aspect, controller 12 controls storage of data using volumes 28 according to desired RAID levels. The number of volumes 28 may be tailored to the particular implementation of system 10.

Virtual storage space 22 provides an abstract representation of physical storage space 24 to host 20. Virtual storage space 22 may be modified as desired by controller 12 or host 20. For example, virtual storage space 22 may be tailored to represent physical storage space 24 in a format which may be conveniently accessed by host 20. In turn, a logical volume manager of host 20 may provide yet another virtual abstraction of virtual storage space 22 (not shown) in a format which may be conveniently utilized by host applications.

Virtual storage space 22 of system 10 includes a plurality of addresses or storage locations 30. The depicted exemplary physical, storage space 24 includes a plurality of addresses or storage locations 36. Addresses 30 of virtual storage space 22 are utilized to provide addressing of addresses 36 of physical storage space 24 wherein data is stored.

For example, in one embodiment, controller 12 operates to create and implement a mapping system 32 comprising a plurality of pointers 34. Pointers 34 of mapping system 32 may be stored within memory 18 and associate a plurality of respective addresses 30 of virtual storage space 22 with respective addresses 36 of physical storage space 24.

Host 20 may read or write data with respect to system 10 by submitting requests. Such requests may address a storage location 30 of virtual storage volumes 26. A request received from host 20 identifying a virtual storage location 30 has an associated pointer 34 which identifies the respective physical storage location 36 which contains the actual data to be read by host 20, or written to by host 20, as indicated in the request identifying the virtual storage location 30.

Individual virtual storage locations 30 may represent a common predefined amount of data at physical storage locations 36 in the described implementation. For example, virtual storage locations 30 may refer to clusters including 512 blocks which individually include 512 bytes of data in one exemplary arrangement. Accordingly, a virtual storage location 30 refers to a cluster size piece of data of a respective physical storage location 36 including 512 blocks individually comprising 512 bytes of data providing a total of 256 kbytes of data per physical storage address or location 36 in one embodiment.

Storage system 10 arranged according to a virtual storage architecture is able to implement operations not capable in conventional RAID systems. For example, controller 12 may create a virtual copy of a storage volume 26 by duplicating the pointers of the original volume 26 being copied rather than duplicating the data itself. Such duplication of pointers may be referred to as providing a point in time copy or a snapshot volume of a virtual storage volume 26.

Referring to FIG. 3, additional details of exemplary point in time copy or snapshot operations are described. A plurality of virtual storage volumes 26 and physical storage volumes 28 are shown in FIG. 3. A first virtual storage volume 40 may be referred to as a parent or original volume while a second virtual storage volume 42 may be referred to as a snapshot volume 42. Snapshot operations may be performed to create a new snapshot volume or to refresh an existing snapshot volume to provide a snapshot of the original volume.

In the depicted example, original volume 40 includes a plurality of respective pointers 34 at a given moment in time which map virtual storage locations 30 to physical storage locations 36. During a snapshot operation, controller 12 creates another virtual storage volume 42 of the original volume 40. In one embodiment, controller 12 copies the associated pointers 34 of volume 40 and creates volume 42 including the same pointers 34 pointing to the same physical storage locations 36 as original volume 40 at the moment in time when volume 40 is snapped.

When first created, snapshot volume 42 shares all of its associated physical storage space 28 with original volume 40. Thereafter, data of either the snapshot volume 42 or the original volume 40 may be updated responsive to operations from host 20 or internal operations of controller 12. When an update occurs, new physical storage space is allocated to hold the new/modified data. The corresponding pointer(s) 34 for the new/modified data of either the snapshot volume 42 or the original volume 40 (i.e., the volume that received the new/modified data) are set to point to the new physical storage address 36 storing the new data while the corresponding respective pointer(s) 34 of the unmodified data point to the same or original address(es) 36 to preserve the snapped data. The provision of new pointers for the new\modified data process is called divergence. Space that has diverged is no longer shared between snapshot volume 42 and original volume 40.

For example, as shown in FIG. 3, a virtual storage location 44 initially addresses a physical storage location 46. Accordingly, following a snapshot operation 47 of original volume 40, a respective virtual storage location 48 of snapshot volume 42 also addresses physical storage location 46. Thereafter, assume a first write operation 49 occurs to virtual storage location 44. Data is retrieved from physical storage location 46, modified by the first write operation, and stored as diverged data in a new physical storage location 50. The pointer 34 associated with virtual storage location 44 becomes a divergence pointer to address physical storage location 50 following the first write operation 48. However, a pointer 34 of virtual storage location 48 of snapshot volume 42 still addresses physical storage location 46 providing access to the unmodified original data which was snapped.

Updates to data of snapshot volume 42 may also occur as illustrated by the exemplary second write operation 52 to a virtual storage location 54 of snapshot volume 42. A pointer 34 previously associated with virtual storage location 54 and a corresponding physical storage location 55 is adjusted to now refer to a new physical storage location 56 following the second write operation and including the modified data which was previously stored as physical storage location 55. A pointer 34 associated with a virtual storage location 58 of original volume 40 still addresses physical storage location 55 following the second write operation.

Since a snapshot volume does not consume additional physical storage space at the moment in time the parent volume is snapped, it is possible to configure a snapshot volume so that available physical storage space of storage system 10 becomes exhausted as divergence occurs. System 10 permits snapshot operations even if system 10 does not have sufficient physical storage space to accommodate divergence of the resulting snapshot volume as data is modified. This state of the storage system 10 may be referred to as over committed. It may be advantageous to allow storage system 10 to become over committed because one or more snapshot volumes of system 10 may not experience complete divergence in their cycle of use. In such a case and with over commitment, storage system 10 may give an appearance that it has more storage space (represented by virtual storage space) than its available physical storage space. Details of representing non-guaranteed available capacity are discussed in U.S. patent application entitled "Computer Systems, Virtual Storage Systems, Virtual Storage System Operational Methods," naming Michael Jacobson and Lee Nelson as inventors, having Docket No. 100110839-1, incorporated herein by reference.

However, permitting storage system 10 to become over committed presents problems of how to respond if the physical storage space becomes exhausted. Aspects of the present invention provide management of over commitment of physical storage space to avoid an out-of-space condition that might lead to data unavailability. Aspects of the invention avoid out-of-space conditions by allowing predetermined snapshot volumes to be automatically removed by system 10 to fulfill space commitments. Accordingly, automatic removal of one or more snapshot volume (and the associated pointers of the mapping system) is provided according to aspects of the invention to avoid data unavailability.

In one aspect, snapshot volumes are associated with a specific category including guaranteed snapshot volumes and non-guaranteed snapshot volumes upon creation of the snapshot volumes. Guaranteed snapshot volumes may correspond to volumes including critical data of host 20 or otherwise indicated by a system administrator or other entity to be critical while non-guaranteed snapshot volumes may correspond to non-critical data of host 20 or otherwise indicated by the system administrator or other entity to be non-critical. According to one exemplary operational protocol, parent virtual storage volumes and guaranteed snapshot volumes can not be automatically deleted while non-guaranteed snapshot volumes may be automatically deleted by system 10 to avoid exhaustion of the physical storage space. In one arrangement, system 10 will not allow space commitments of parent virtual storage volumes and guaranteed snapshot volumes to exceed the available physical storage space of system 10. According to other aspects, all types of snapshot volumes may be removed.

Accordingly, some aspects of the invention allow non-guaranteed snapshot volumes to be over committed and automatically removed from system 10. Host 20, administrator of system 10 or other entity should configure system 10 to avoid the storage of critical data within non-guaranteed snapshot volumes. Additional aspects of the invention permit prioritization of non-guaranteed snapshot volumes and automatic removal of one or more non-guaranteed snapshot volume according to a prioritization protocol.

Referring to FIG. 4, exemplary prioritization of a plurality of non-guaranteed snapshot volumes 42 is shown according to aspects of the invention. A plurality of association groups 60, 62, 64 are provided during the formation of respective snapshot volumes 42. Respective groups 60, 62, 64 correspond to respective priorities of a prioritization list specifying the removal order of snapshot volumes 42 by groups to avoid exhaustion of physical storage space 24 in exemplary aspects.

Individual groups 60, 62, 64 may include one or more snapshot volume 42. Snapshot volumes 42 of a common group have a common priority assigned by an administrator, host 20, system 10, or other entity. According to one possible removal prioritization protocol, if one snapshot volume 42 of a group is removed, the other snapshot volume(s) 42 of the same group may also be removed to free additional physical storage space 24. For example, snapshot volumes 42 may be provided in respective groups corresponding to associated application programs of host 20. A given application of host 20 may use snapshot volumes 42 of a given group and if one snapshot volume 42 of the group is removed, other snapshot volumes 42 of the same group may also be removed inasmuch as they will no longer be useful to the application. Other criteria may be utilized for grouping snapshot volumes 42.

In one implementation, individual groups of snapshot volumes may have respective group identifiers and group priority attributes which specify member snapshot volumes of the group and the priority of removal of the respective snapshot volumes according to the groups. Grouping of snapshot volumes and prioritization of groups may cause automatic removal of all snapshot volumes of a particular group to occur before any removal of snapshot volumes of a different group.

According to one embodiment, a host application, administrator, or other entity maintains consistency in assignment of group identifiers and group priority attributes to snapshot volumes to assure proper automatic removal. When automatic removal is to occur, group priority is used first for selection followed by the group identifier. Selection for automatic removal may be arbitrary among remaining candidates if group identifier and group priority attributes are not deterministic.

If an administrator, host application, or other entity does not establish a group priority for a given snapshot volume, controller 12 of system 10 may utilize a default priority protocol to specify removal of the given snapshot volume. One possible default priority protocol may specify removal of at least some of the snapshot volumes in chronological order of creation. Accordingly, the oldest snapshot volumes will be automatically removed first if other snapshot volumes or groups have not been assigned with a lower priority in one exemplary protocol.

Aspects of the invention provide a plurality of ways of establishing priority of snapshot volumes. The group priority of a created snapshot volume may be explicitly defined. In another aspect, the group identity of one or more snapshot volume may be explicitly defined which corresponds to an existing group whereupon the group priority of the existing group is defaulted to snapshot volumes of the group. Group priority may be defaulted if an indicated group identifier is assigned to a snapshot volume but does not match an existing group. The described prioritization is exemplary and other prioritization procedures may be utilized.

According to one exemplary operational aspect of system 10, controller 12 is arranged to monitor the remaining capacity of available storage of the physical storage space 24 at a plurality of moments in time during operation of system 10. Upon detection of the remaining data storage capacity of physical storage space 24 reaching a predetermined status, controller 12 is arranged to implement removal operations to preserve the availability of stored data. Controller 12 is arranged to implement removal operations according to the prioritization list which specifies removal priorities as assigned by host 20, the administrator, other entity or default as described above. Following removal of a group of one or more snapshot volumes, it may be necessary to remove additional groups. All non-guaranteed snapshot volumes may be removed if necessary to avoid unavailability of data in one operational aspect.

Upon creation of snapshot volumes, removal action attributes may be assigned to the respective volumes which determine the action taken by controller 12 when automatic removal of the respective snapshot volumes is appropriate. In one aspect, possible removal operations include deletion or detachment. If a snapshot volume is deleted, the respective pointers are removed from memory and the snapshot volume entity is also removed. For detachment of a snapshot volume, the respective pointers are removed but the snapshot volume remains in existence and may be attached and addressed at later moments in time. Reattachment results in refreshment of the snapshot volume. Removal of the pointers removes portions of the mapping system for the respective snapshot volume and frees the physical storage space of the removed pointers.

Additional aspects of the invention enable a given snapshot volume to be modified at a later moment in time between non-guaranteed and guaranteed statuses. However, in one exemplary operational aspect, if a conversion change of a snapshot volume is requested from non-guaranteed to guaranteed, such change is only allowed if the additional physical storage space implied by the change is available. Guaranteed snapshot volumes may be converted to non-guaranteed snapshot volumes. Non-guaranteed snapshot attributes may be assigned to guaranteed snapshot volumes upon creation in case such guaranteed snapshot volumes are converted to non-guaranteed at a later moment in time.

Additional aspects of the invention enable system 10 to generate one or more warning corresponding to one or more available capacity status of the physical storage space. One or more warning may be utilized to alert an administrator or other entity as system 10 approaches an out-of-space condition. Following the warning(s), an administrator or other entity may implement space management operations before a non-guaranteed snapshot volume is deleted. For example, additional disks may be added to the physical storage space or unused virtual storage volumes may be removed. In one aspect, three thresholds (25%, 10%, and 5% remaining capacity of the physical storage space) and associated warnings may be provided prior to automatic removal of a snapshot volume at another threshold such as 2% remaining capacity. Other thresholds and warning operations may be utilized.

According to other aspects of the invention, system 10 may provide no warnings before removal of a snapshot volume and system 10 may perform the removal without host application or user assistance.

Additional aspects provide an alarm that is raised after removal of one or more snapshot volume. A host, administrator or other entity may deactivate the alarm after it has been raised by system 10 so that a new occurrence of an automatic removal alarm is not raised during an acknowledgement of a previous one.

Additional aspects of the invention provide generation of a list of snapshot volumes by controller 12 including the volumes that are subject to automatic removal and the order they will be removed as the physical storage space continues to be consumed.

Some aspects of the invention may impose restrictions upon creation of non-guaranteed snapshot volumes. For example, some restrictions may be based upon a current condition of the physical storage space according to exemplary aspects. For example, the creation of a new non-guaranteed snapshot volume may be prevented if it is determined that the creation of the new non-guaranteed snapshot volume would cause the deletion of one or more existing non-guaranteed snapshot volume as additional physical space is consumed after creation. Alternatively, such creation of the new non-guaranteed snapshot volume may be permitted according to other aspects, and it is the responsibility of host 20, administrator or other entity to accommodate the creation and possible deletion of other non-guaranteed snapshot volumes.

Referring to FIG. 5, an exemplary operational method executable by controller 12 to implement aspects of the invention is illustrated. The depicted methodology may be embodied as executable code within memory 18 and executed by controller 12. The methodology is presented to illustrate exemplary steps for performing aspects of the invention. Other methods are possible including more, less or alternative steps.

Referring to a step S10, the controller operates to create one or more non-guaranteed snapshot volume.

At a step S12, the controller processes one or more write command, for example, from a host.

At a step S14, the controller creates one or more divergence pointer to point to a new physical storage address(es) wherein the modified data resides.

At a step S16, the controller compares the remaining available capacity of the physical storage space with one or more threshold.

In one embodiment, physical capacity is continuously monitored at a step S16 to determine if removal is appropriate. Additional snapshot volumes may also be created at future moments in time and monitoring of the physical capacity status would be implemented as described herein.

If the condition of step S16 is positive indicating exhaustion of the physical storage space, the controller may access the prioritization list including the priorities of groups of non-guaranteed snapshot volumes at a step S18.

At a step S20, controller operates to remove the non-guaranteed snapshot volumes associated with the group having the lowest priority.

Aspects of the present invention provide numerous improvements to techniques for accommodating over commitment. For example, some solutions provided predictive capabilities including monitoring systems and system administrator warnings if the physical storage space neared exhaustion. Corrective action could be performed by the system administrator in terms of adding additional physical space (e.g., disks) to the system or manually deleting unused volumes from the system. Numerous disadvantages exist inasmuch as a response from the system administrator is required and the individual may be unavailable. If there is no response, physical space may become exhausted often resulting in data unavailability or data loss.

Aspects of the present invention provide automatic removal of snapshot volume(s) including associated benefits of not requiring system administrator response to avoid physical space exhaustion. The storage system, host, administrator, or other entity may configure an automatic deletion policy according to aspects of the invention to enable appropriate action without human intervention when physical storage space nears exhaustion. Aspects of the invention eliminate the possibility that lack of administrator response will lead to data unavailability or data loss making over committed snapshot operations more feasible, manageable, useful, and acceptable to users of storage systems.

The protection sought is not to be limited to the disclosed embodiments, which are given by way of example only, but instead is to be limited only by the scope of the appended claims.

What is claimed is:

1. A virtual storage system comprising:
   a virtual storage space;
   a physical storage space;
   a mapping system configured to associate a plurality of addresses of the virtual storage space with respective addresses of the physical storage space; and
   a controller configured to automatically remove a portion of the mapping system according to a prioritization protocol which specifies removal of portions of the mapping system according to a predefined order, the controller configured to issue a warning before the removal.

2. The system of claim 1 wherein the controller is configured to perform the automatic removal responsive to the physical storage space reaching a predetermined status of data storage.

3. The system of claim 2 wherein the controller is configured to perform the automatic removal without input from a user.

4. The system of claim 1 wherein the virtual storage space comprises a plurality of virtual storage volumes and the physical storage space comprises an array of hard disks.

5. The system of claim 4 wherein the virtual storage volumes comprise LUNs.

6. The system of claim 1 wherein the removed portion of the mapping system comprises a plurality of pointers.

7. The system of claim 1 wherein the controller is configured to automatically remove the portion of the mapping system comprising a plurality of pointers corresponding to non-guaranteed virtual storage space.

8. The system of claim 1 wherein the prioritization protocol includes a plurality of groups individually comprising at least one virtual storage volume assigned with a common removal priority.

9. The system of claim 1 wherein the prioritization protocol includes a default priority protocol configured to specify removal of a plurality of portions of the mapping system according to a chronological order of creation.

10. The system of claim 1 wherein the prioritization protocol identifies non-guaranteed portions of the mapping system subject to removal.

11. The system of claim 1 wherein the controller is configured to delete a snapshot volume to remove the portion of the mapping system.

12. The system of claim 1 wherein the controller is configured to detach a snapshot volume to remove the portion of the mapping system.

13. The system of claim 1 wherein the controller is configured to issue at least one alarm indicating removal of the portion of the mapping system.

14. The system of claim 1 wherein the controller is configured to not issue a warning before the removal.

15. The system of claim 1 wherein the mapping system comprises a plurality of pointers for the addresses of the physical storage space, and the controller is configured to create a plurality of snapshot volumes individually comprising a copy of at least some of the pointers at a moment in time.

16. The system of claim 15 wherein the order specifies that one of the snapshot volumes is to be removed before an other of the snap shot volumes.

17. The system of claim 16 wherein the removal of the portion of the mapping system comprises removing the one of the snapshot volumes.

18. The system of claim 1 wherein the predefined order is defined before a condition exists which causes the removal of the portion of the mapping system.

19. The system of claim 1 wherein the predefined order is defined before data stored using the physical storage space is deleted.

20. The system of claim 1 wherein the predefined order specifies the removal of the portions of the mapping system independent of deletion of data stored using the physical storage space.

21. The system of claim 1 wherein the predefined order specifies removal of one of the portions of the mapping system before removal of an other portion of the mapping system, and wherein the other portion of the mapping system is created at a moment in time after creation of the one portion of the mapping system.

22. The system of claim 1 wherein the predefined order specifies removal of the portions of the mapping system independent of time of creation of the portions of the mapping system.

23. The system of claim 1 wherein the predefined order is specified by a user.

24. A virtual storage system comprising:
physical storage means for storing data;
virtual storage means for providing a representation of the physical storage means to a host;
mapping means for providing a plurality of pointers from a plurality of addresses of the virtual storage means to a plurality of respective addresses of the physical storage means;
control means for detecting a predetermined status of the physical storage means and automatically removing at least some of the pointers responsive to the detecting; and
means for issuing a warning before the removal of at least some of the pointers.

25. The system of claim 24 wherein the virtual storage means comprises a plurality of virtual storage volumes comprising snapshot volumes, and the control means is configured to automatically remove the at least some of the pointers corresponding to a non-guaranteed snapshot volume.

26. The system of claim 24 wherein the virtual storage means comprises a plurality of virtual storage volumes and a plurality of priorities are associated with respective ones of the virtual storage volumes, and the control means is configured to automatically remove the at least some of the pointers responsive to the priorities.

27. The system of claim 24 wherein the control means comprises means for copying at least some of the pointers providing pointers of a snapshot volume, and the removing the at least some of the pointers comprises removing the pointers of the snapshot volume.

28. The system of claim 2 wherein the control means comprises means for copying at least some of the pointers providing pointers of a plurality of snapshot volumes, and the removing the at least some of the pointers comprises:
selecting one of the snapshot volumes according to an order; and
removing the pointers of the one of the snapshot volumes.

29. The system of claim 24 wherein the control means comprises means for removing the at least some of the pointers according to a chronological order of creation of the at least some of the pointers.

30. The system of claim 24 wherein the control means comprises means for monitoring the status regarding an available capacity of the physical storage means for storing data, and the detecting comprises detecting the predetermined status responsive to the monitoring.

31. A virtual storage method comprising:
providing a virtual storage space comprising a plurality of virtual storage volumes;
providing a physical storage space;
creating a plurality of snapshot volumes of at least some of the virtual storage volumes;
assigning respective priorities to the snapshot volumes;
removing at least one of the snapshot volumes according to the priorities;
defining the snapshot volumes as individually being one of guaranteed and non-guaranteed, wherein the guaranteed volumes are not susceptible to being removed during the removing and the removing comprises removing the at least one of the snapshot volumes responsive to the at least one of the snapshot volumes being non-guaranteed.

32. The method of claim 31 further comprising detecting a predetermined status of the physical storage space, and wherein the removing comprises removing responsive to the detecting.

33. The method of claim 31 wherein the creating comprises creating guaranteed and non-guaranteed snapshot volumes, and the removing comprises removing at least one of the non-guaranteed snapshot volumes.

34. The method of claim 33 further comprising converting a guaranteed snapshot volume to a non-guaranteed snapshot volume.

35. The method of claim 31 wherein the creating comprises creating a plurality of groups individually corresponding to at least one of the snapshot volumes, and the assigning comprises assigning the priorities to the groups.

36. The method of claim 31 wherein the assigning comprises assigning at least some of the priorities according to a default priority protocol configured to specify the removing of the snapshot volumes in chronological order of creation.

37. The method of claim 31 wherein the removing comprises removing without issuance of a warning.

38. The method of claim 31 further comprising associating a plurality of addresses of the virtual storage space with a plurality of addresses of the physical storage space using a plurality of pointers of the virtual storage volumes, and wherein the creating the snapshot volumes comprises, for individual ones of the snapshot volumes, copying the pointers of a respective one of the virtual storage volumes.

39. The method of claim 31 wherein the assigning respective priorities comprises identifying the at least one of the snapshot volumes for removal before an other of the snapshot volumes.

40. The method of claim 31 wherein the priorities specify removal of the snapshot volumes corresponding to chronological order of creation of the snapshot volumes.

41. The method of claim 31 wherein the creating comprises specifying individual ones of the snapshot volumes as being one of guaranteed and non-guaranteed.

42. A method of over committing a virtual RAID storage system, the method comprising:
   providing a plurality of pointers to associate a plurality of physical storage locations of a physical storage space with a plurality of virtual storage locations of a virtual storage space;
   over committing the virtual storage system including copying at least some of the pointers providing a plurality of snapshot volumes;
   assigning a plurality of priorities to respective ones of the snapshot volumes;
   diverging at least some of the pointers after the copying including associating the diverged pointers with a plurality of new respective physical storage locations, the diverging consuming additional physical storage space to store diverged data associated with respective ones of the diverged pointers;
   detecting a remaining storage capacity of the physical storage space obtaining a predetermined status after the diverging;
   selecting at least one of the snapshot volumes using the priorities and responsive to the detecting; and removing the at least one of the snapshot volumes after the selecting.

43. The method of claim 42 further comprising providing the virtual storage space comprising a plurality of virtual storage volumes, and wherein the snapshot volumes comprise virtual storage volumes.

44. The method of claim 43 further comprising specifying individual ones of the virtual storage volumes as one of guaranteed and non-guaranteed, and wherein the assigning comprises assigning the priorities to non-guaranteed virtual storage volumes and the removing comprises removing at least one of the non-guaranteed virtual storage volumes.

45. The method of claim 42 further comprising creating a plurality of groups individually corresponding to at least one of the snapshot volumes, and the assigning comprises assigning the priorities to the groups.

46. The method of claim 42 wherein the assigning comprises assigning at least some of the priorities according to a default priority protocol configured to specify the removing of the snapshot volumes in chronological order of creation.

47. The method of claim 42 wherein the removing comprises removing without issuance of a warning.

48. The method of claim 42 wherein priorities are assigned to a plurality of the snapshot volumes at the same moment in time.

49. The method of claim 42 further comprising modifying at least one of the at least some of the pointers used to create one of the snapshot volumes after the copying.

50. The method of claim 42 wherein the snapshot volumes are copied from a plurality of respective virtual storage volumes, and the diverging comprises changing data of one of the virtual storage volumes to provide the diverged data which is not present in the respective one of the snapshot volumes which corresponds to the one of the virtual storage volumes.

* * * * *

UNITED STATES PATENT AND TRADEMARK OFFICE
CERTIFICATE OF CORRECTION

| | | |
|---|---|---|
| PATENT NO. | : 8,219,777 B2 | Page 1 of 1 |
| APPLICATION NO. | : 10/264659 | |
| DATED | : July 10, 2012 | |
| INVENTOR(S) | : Michael Jacobson et al. | |

It is certified that error appears in the above-identified patent and that said Letters Patent is hereby corrected as shown below:

In column 12, line 6, in Claim 28, delete "claim 2" and insert -- claim 24 --, therefor.

Signed and Sealed this
Fifteenth Day of January, 2013

David J. Kappos
*Director of the United States Patent and Trademark Office*